United States Patent
Hunt

(10) Patent No.: US 9,923,350 B1
(45) Date of Patent: Mar. 20, 2018

(54) SYSTEM AND APPARATUS FOR PROVIDING FUNCTIONAL AND DECORATIVE ELECTRICAL COVER PLATES

(71) Applicant: Michael Hunt, Trumansburg, NY (US)

(72) Inventor: Michael Hunt, Trumansburg, NY (US)

( * ) Notice: Subject to any disclaimer, the term of this patent is extended or adjusted under 35 U.S.C. 154(b) by 0 days.

(21) Appl. No.: 15/290,662

(22) Filed: Oct. 11, 2016

(51) Int. Cl.
*H02G 3/08* (2006.01)
*H02G 3/12* (2006.01)

(52) U.S. Cl.
CPC ............... *H02G 3/083* (2013.01); *H02G 3/12* (2013.01)

(58) Field of Classification Search
CPC ................................. H02G 3/083; H02G 3/12
USPC ........................................................... 174/66
See application file for complete search history.

(56) References Cited

U.S. PATENT DOCUMENTS

| | | | |
|---|---|---|---|
| 2,515,820 A * | 7/1950 | Clark | H01H 9/185 174/66 |
| 4,508,933 A | 4/1985 | Carvel | |
| 4,800,239 A * | 1/1989 | Hill | H02G 3/14 174/66 |
| 5,723,816 A | 3/1998 | Neece | |
| 5,747,738 A | 5/1998 | Indoe | |
| 5,837,937 A | 11/1998 | Reese et al. | |
| 6,159,034 A | 12/2000 | Royer | |
| 6,218,616 B1 | 4/2001 | Bates et al. | |
| 6,703,562 B1 | 3/2004 | Pacheco | |
| 6,780,031 B1 | 8/2004 | Valls | |
| 6,927,341 B1 | 8/2005 | Crane | |
| 7,102,081 B2 | 9/2006 | Xu et al. | |
| 7,129,413 B1 | 10/2006 | Rao et al. | |
| 7,229,322 B2 | 6/2007 | Bangert | |
| 8,212,146 B1 | 7/2012 | Moore | |
| 8,283,812 B2 | 10/2012 | Azancot et al. | |
| 8,399,765 B1 | 3/2013 | Baldwin et al. | |
| 8,592,681 B2 | 11/2013 | Alderson et al. | |
| 9,101,051 B1 | 8/2015 | Ferrara et al. | |
| 2009/0014197 A1 | 1/2009 | Eastin | |
| 2011/0073347 A1 | 3/2011 | Boa | |

FOREIGN PATENT DOCUMENTS

CA 2411946 A1 11/2002

* cited by examiner

*Primary Examiner* — Dhirubhai R Patel
(74) *Attorney, Agent, or Firm* — Randall L. Reed; Miller Mayer LLP

(57) ABSTRACT

A decorative and functional electrical wall box plate cover assembly consisting of a back plate, center plate and front plate held together with a connecting and aligning mechanism. The center and front plate can be configured with decorative designs. The electrical plate cover assembly is designed to interconnect with auxiliary plate system to form a predetermined configuration on a wall surrounding the electrical box on the wall. The electrical wall box plate cover assembly can be used with electrical switch boxes, electrical outlet boxes or a combination of both.

19 Claims, 15 Drawing Sheets

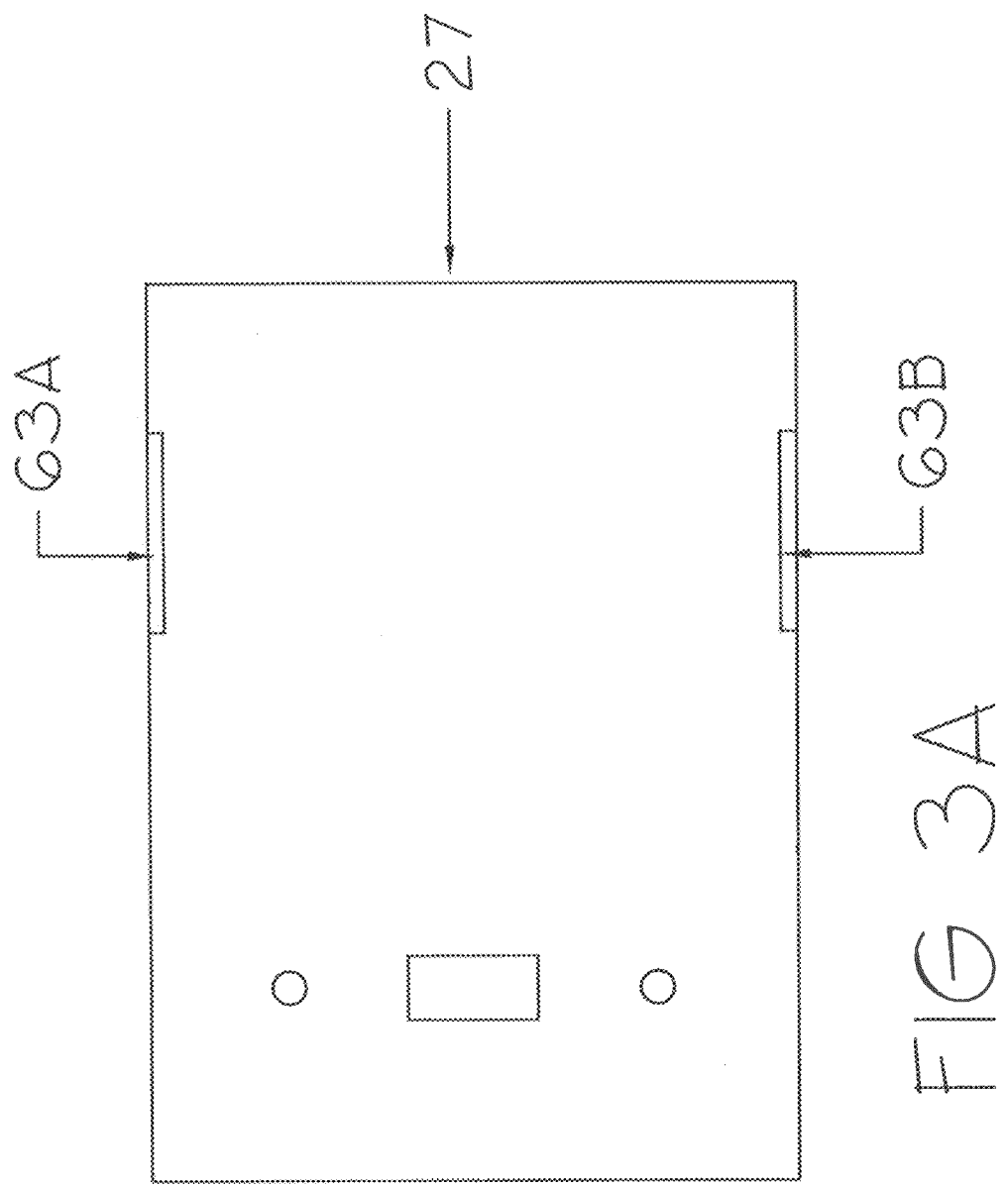

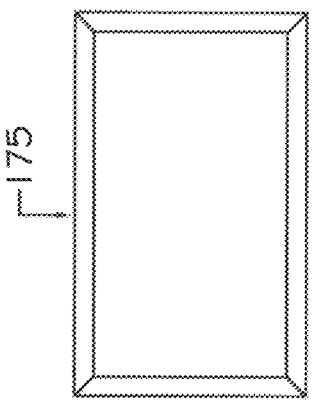
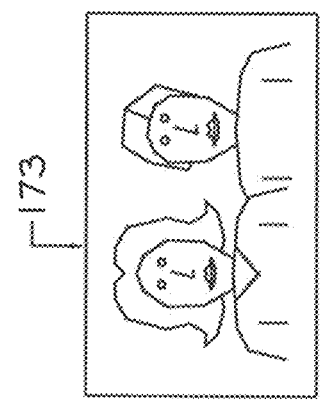
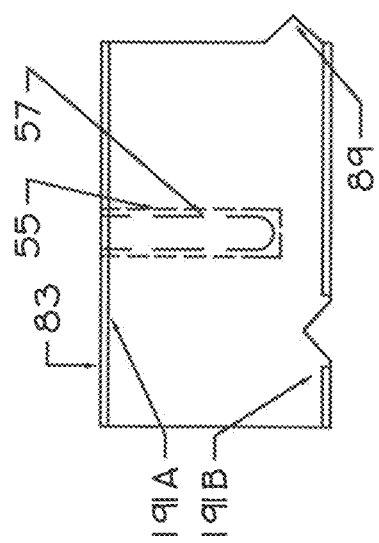
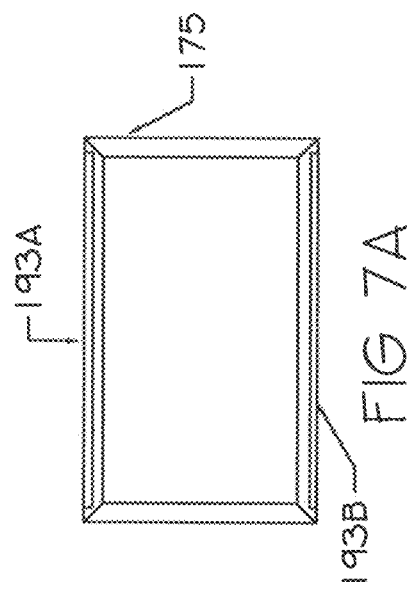
FIG 7
FIG 7A

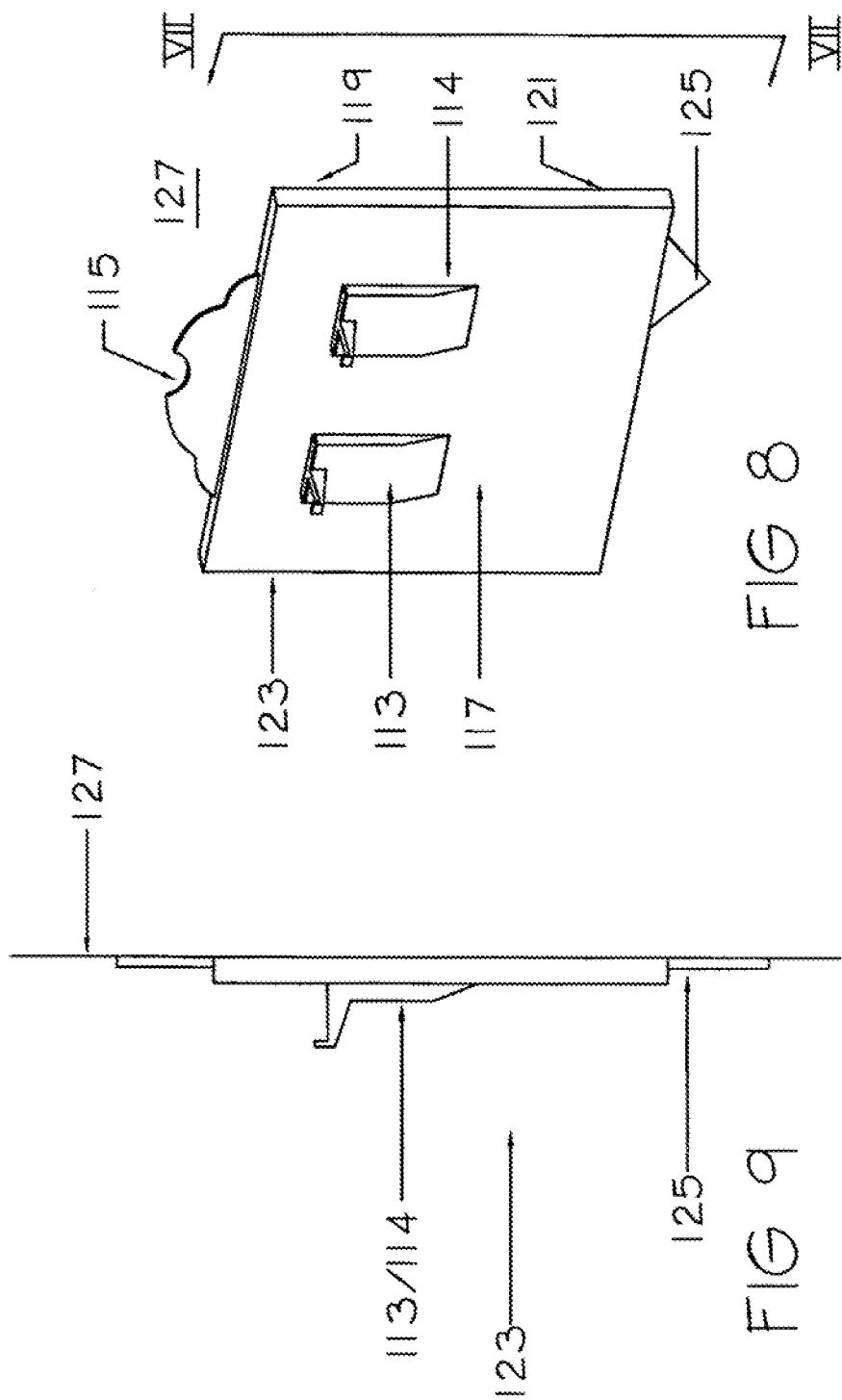

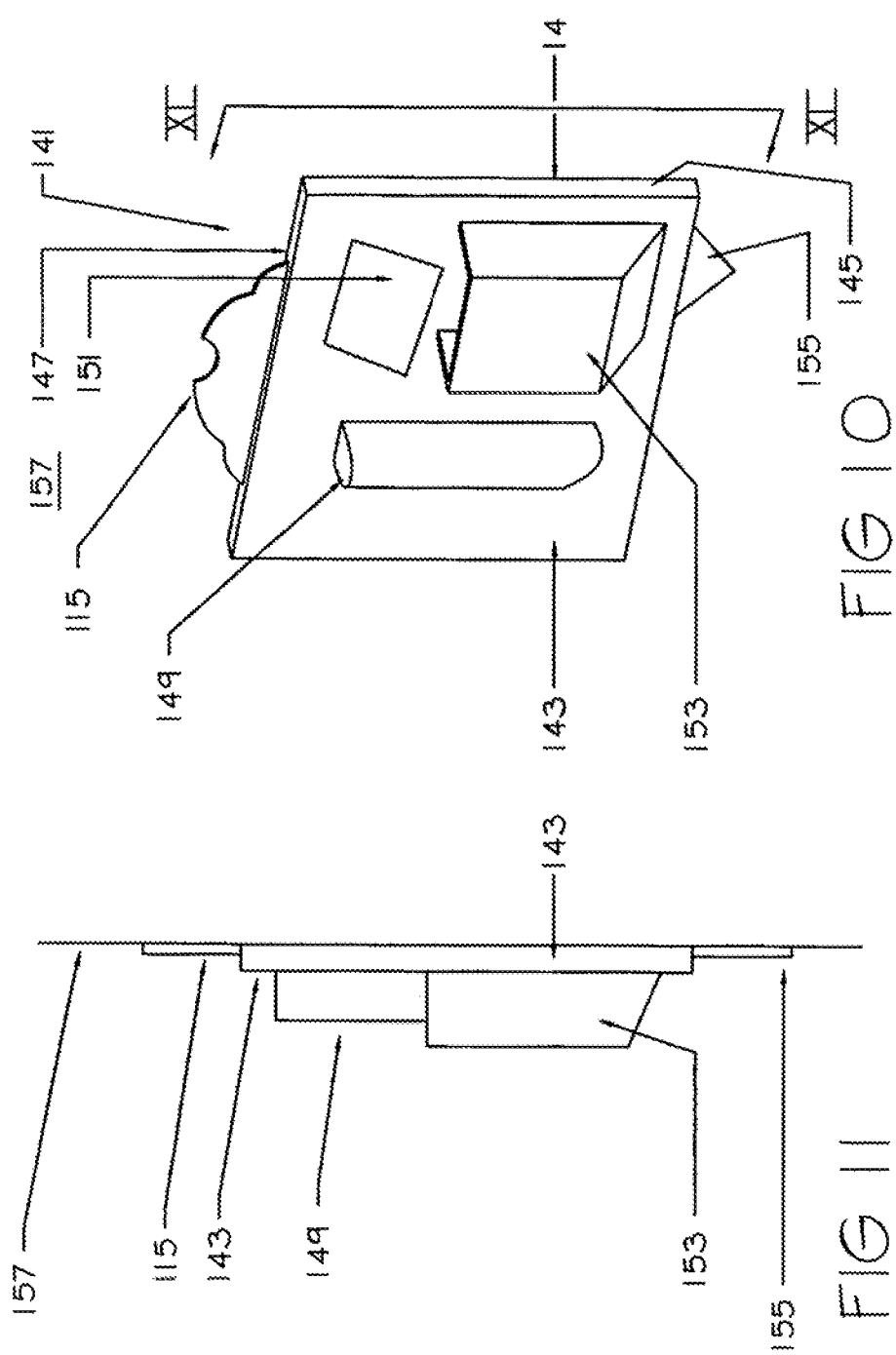

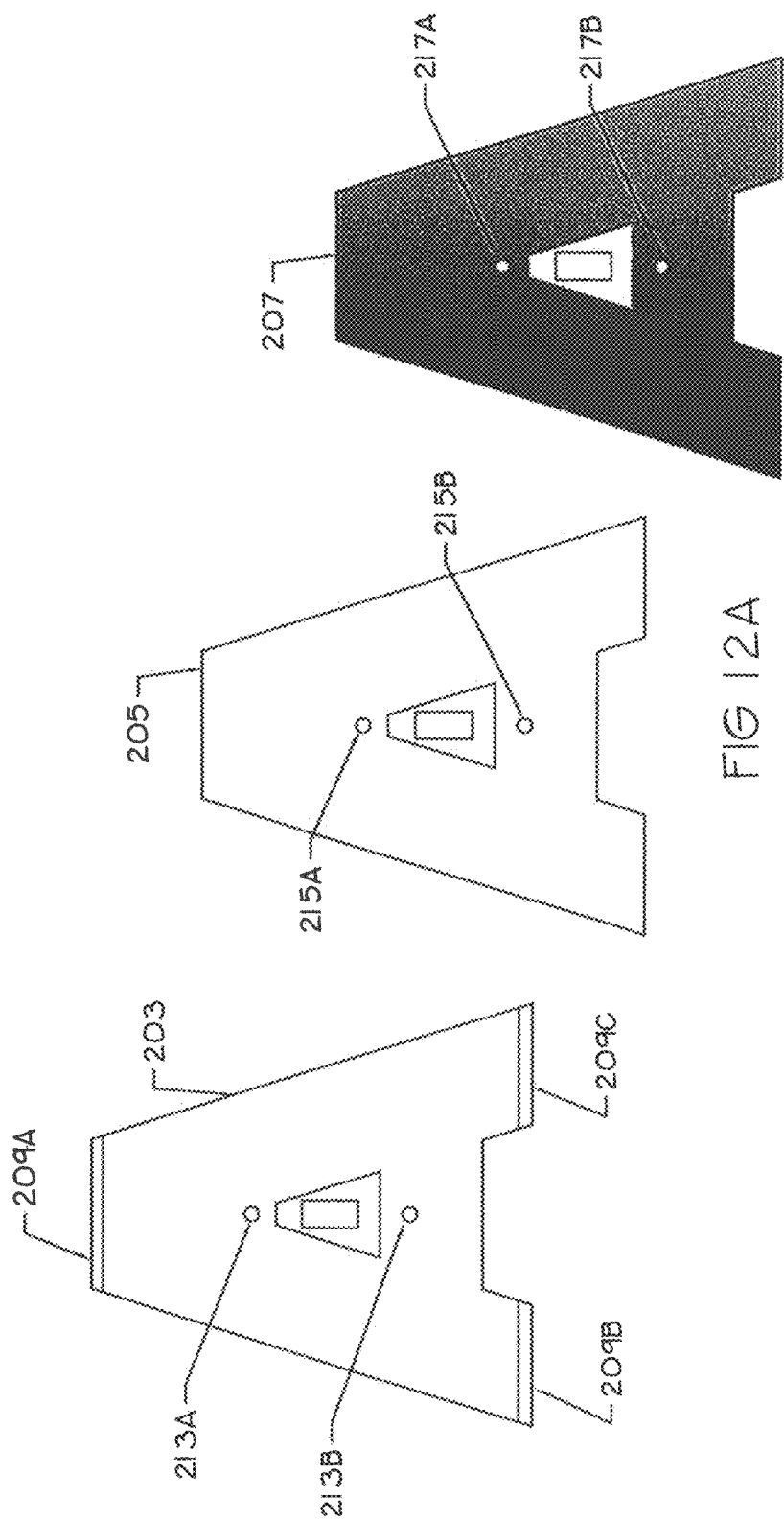

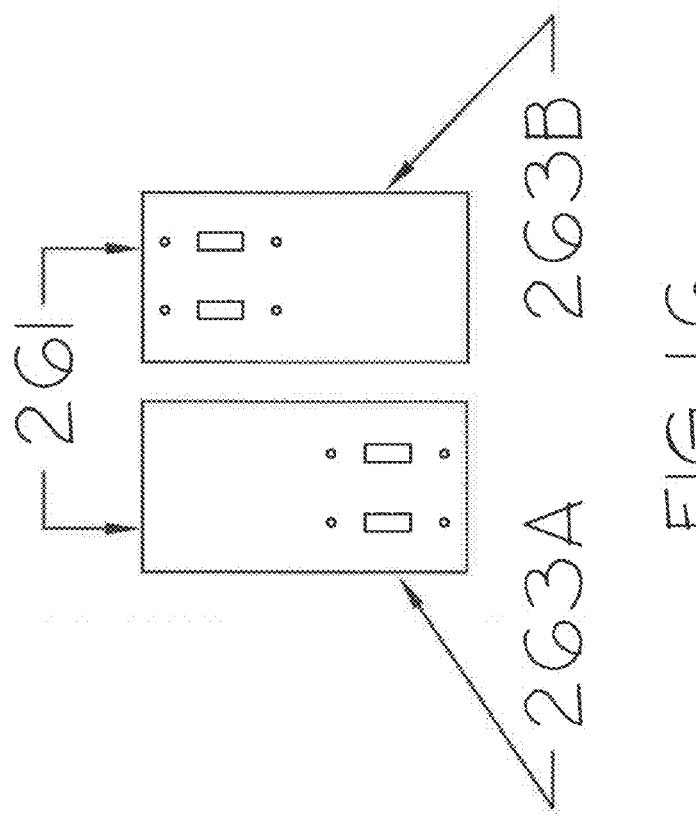
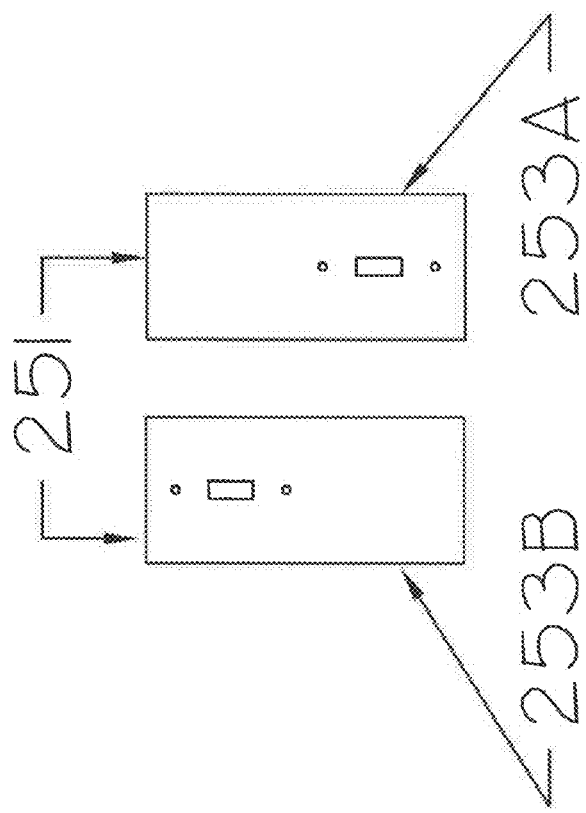

SYSTEM AND APPARATUS FOR PROVIDING FUNCTIONAL AND DECORATIVE ELECTRICAL COVER PLATES

TECHNICAL FIELD

The disclosure relates generally to a system and apparatus for electrical switch and outlet plate covers and more particularly to a system and apparatus for providing decorative and functional electrical switch and outlet plate covers.

BACKGROUND

Electrical cover plates, those used to cover electrical outlet boxes and switch boxes used in buildings, homes and other structures have been around since the advent of the availability of electrical power for homes, businesses and commercial buildings. They are typically made of plastic-like material or sometimes metal. They attach to the electrical box, be it an outlet box or switch box with screws that are inserted through screw holes in the cover plate. The screw holes in the cover plate line up with screw receptacles in the electrical box. The electrical cover plates have apertures in them that allow the plate to surround the outlets in an outlet box and the switch or switches in an electrical switch box.

The electrical cover plates, as the name implies, cover the entire electrical box shielding those using the outlets or switches from the electrical wiring in the electrical box. Electrical cover plates thus provide an important safety function.

Electrical cover plates typically have a bland or unassuming color or appearance to allow them to blend into the room décor. However, there have been attempts to make them more decorative and functional. U.S. Pat. No. 5,837,937 issued to Reese, et al. provides a system with two cover plates that allow for the inclusion of information regarding the purpose of the electrical box on one of the plates. U.S. Patent Application Publication No. 20090014197 of Eastin discloses a two plate system with a removable transparent outer plate that can be painted to match a room color. U.S. Pat. No. 4,800,239 issued to Hill shows a multi-plate system that uses a framing mechanism which allows for the inclusion of decorative features on some of the plates and includes the ability to change the décor on the plates.

However, heretofore no one has developed a system that is easy to install on standard electrical boxes and allows for integration into a room's decor and also provides a variety of functional decorative features as well.

No admission is made that any reference cited herein constitutes prior art. Applicant expressly reserves the right to challenge the accuracy and pertinence of any cited documents.

SUMMARY

To accomplish the above and other objectives one embodiment of the disclosure relates to an electrical wall box plate cover assembly has: a) a back plate configured to attach to an electrical wall box; b) a center plate configured to connect to the back plate with a connection and aligning mechanism; c) a front plate configured to connect to the back plate with the connection and aligning mechanism; d) wherein when the back plate, the center plate and the front plate are attached together with the connection and aligning mechanism, electrical interface apertures located on the front plate, the center plate and the back plate are aligned together, and thus allow access to an electrical system interface device; e) wherein the front plate consists of a clean, light transparent material and the center plate can be configured with art work; f) the base plate, the center plate and the front plate each have an extended portion; g) the connection and aligning mechanism comprises: 1) screw holes on each of the plates that when the screw holes on each plate are aligned, the plates can be attached to an electrical interface outlet; and 2) the base plate having a securing and aligning structure to secure a portion of the center plate and connect to an engaging portion of the front plate to connect the front plate to the back plate; h) wherein a reverse side of the extended portion of the back plate has a detachable connecting mechanism to detachably connect the extended portion of the back plate to a wall.

In a variation of this embodiment the electrical wall box plate cover assembly the center plate is provided with a surface to accept art work which can be viewed through the cover plate when the back plate, center plate and front plate are connected together with the securing mechanism. In yet another variation artwork can be added to the cover plate. In yet another variation artwork can be added to the cover plate by etching the cover plate.

The electrical wall box plate assembly of claim 1 wherein the detachable connecting mechanism to detachably connect the extended portion of the back plate to a wall comprises a tab channel on the extended portion of the back plate wherein the tab channel can accommodate a first surface of a tab with adhesive on the first surface and adhesive on an opposite second surface of the tab, which second surface can be placed against a wall to secure the extended portion to the wall.

In another aspect the electrical wall box plate assembly plate assembly it can be configured with an aperture for an electrical wall box containing electrical interface devices for electrical switches, electrical outlets and a combination of a switches and outlets.

In another aspect of The electrical wall box plate assembly a) the securing and aligning structure on the back plate is first flanged gripper located on a top edge of the base plate and projecting out from the base plate and a mirror image second flange gripper on a bottom edge of the back plate opposite the first flange gripper; and b) the front plate engaging portion consists of a first flange projecting from a backside of the front plate adjacent its top edge and a mirror image second flange projecting from the backside of the front plate adjacent a bottom edge of the front plate, the first and second flange being positioned such that when the back side of the front plate faces the back plate and the screw holes of the front plate and the back plate are aligned the first flange of the front plate aligns with the first flange gripper and the second flange aligns with the second flange gripper and first and second flanges can detachably engage the first and second flange grippers.

In yet another aspect of the electrical wall box plate assembly the back plate has at least one positioning and aligning structure that together with a position and aligning structure on an auxiliary back plate aligns the back plate and the auxiliary back plate such that when the plates are aligned together on a wall they form a predetermined configuration on the wall. In another variation the electrical wall box plate assembly the at least one positioning and aligning structure on the back plate is a detent and the positioning and aligning structure on the auxiliary plate is a projection that mates with the detent.

In yet another variation of the electrical wall box plate assembly the extended area of the base plate assembly when covering an electrical box can project from the electrical box in in a direction selected from the group consisting of: up, down left or right. It is note that base plate assembly and primary plate assembly are used synonymously.

In an additional embodiment the disclosure provides a functional and decorative wall plate configuration having: a) a primary plate assembly that covers an electrical wall box interface; and b) at least one auxiliary plate assembly that interconnects through a plate interconnecting apparatus to the primary plate assembly such that when the primary plate assembly is attached to a wall and covering an electrical interface box the at least one auxiliary plate assembly can be positioned in a predetermined position adjacent to the base plate assembly to provide a predetermined configuration on the wall.

In another aspect the functional and decorative wall plate configuration the interconnecting apparatus includes at least one detent on a back plate of the primary plate assembly and at least one projection on a back plate of the at least one auxiliary plate assembly.

In yet another aspect of the functional and decorative wall plate configuration the primary plate assembly includes the back plate, a center plate and a front plate, and the back plate, the center plate and the front plate are connected together by an interconnect mechanisms on the back and front plate.

In another variation of the functional and decorative wall plate configuration the auxiliary plate assembly has of the back plate, a center plate and a front plate, and the back plate, the center plate and the front plate are connected together by an interconnect mechanism on the back and front plate.

In another aspect of the functional and decorative wall plate configuration the electrical wall box interface is can be a switch box, an outlet box of a combination of a switch-outlet box.

In another aspect of the functional and decorative wall plate configuration the auxiliary plate assembly can be a picture frame, a key holder, a note holder or a design pattern holder.

In yet another embodiment the disclosure describes an electrical wall box plate cover assembly having: a) a back plate configured to attach to an electrical wall box; b) a center plate configured to connect to the back plate with a connection and aligning mechanism; c) a front plate configured to connect to the back plate with the connection and aligning mechanism; d) wherein when the back plate, the center plate and the front plate are attached together with the connection and aligning mechanism, electrical interface apertures located on the front plate, the center plate and the back plate are aligned together, and thus allow access to an electrical system interface device; and f) the connection and aligning mechanism includes: 1) screw holes on each of the plates that when the screw holes on each plate are aligned, the plates can be attached to an electrical interface outlet; and 2) the base plate having a securing and aligning structure to secure the center plate and connect to an engaging portion of the front plate to connect the front plate to the back plate with the center plate there between.

In another aspect of this embodiment of the electrical wall box plate assembly: a) the securing and aligning structure on the back plate is first flanged gripper located on a top edge of the base plate and projecting out from the base plate and a mirror image second flange gripper on a bottom edge of the back plate opposite the first flange gripper; and b) the front plate engaging portion includes a first flange projecting from a backside of the front plate adjacent its top edge and a mirror image second flange projecting from the backside of the front plate adjacent a bottom edge of the front plate, the first and second flange being positioned such that when the back side of the front plate faces the back plate and the screw holes of the front plate and the back plate are aligned the first flange of the front plate aligns with the first flange gripper and the second flange aligns with the second flange gripper and first and second flanges can detachably engage the first and second flange grippers.

In another aspect of the electrical wall box plate cover assembly: a) the center plate is provided with a surface to accept art work which can be viewed through the cover plate when the back plate, center plate and front plate are connected together with the securing mechanism; b) wherein the aligned apertures are sized and positioned to accept interface devices selected from a group consisting of: electrical switches, electrical outlets and a combination of electrical switches and electrical outlets; and c) the decorative designs are selected from a group consisting of a letter of the alphabet, a butterfly, a beetle, and a flower.

In another embodiment the invention provides a method for providing a functional and decorative wall plate configuration having the steps of: a) providing a primary plate assembly that covers an electrical wall box interface; and b) providing at least one auxiliary plate assembly that interconnects through a plate interconnecting apparatus to the base plate assembly such that when the primary plate assembly is attached to a wall and covering an electrical interface box the auxiliary plate assembly can be positioned in a predetermined position adjacent to the base plate assembly to provide a predetermined configuration on the wall.

Additional features and advantages will be set forth in the detailed description which follows, and in part will be readily apparent to those skilled in the art from the description or recognized by practicing the embodiments as described in the written description and claims hereof, as well as the appended drawings:

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A is a perspective view of the back side of the front plate showing the securing flanges on the front plate;

FIG. 7 is an exploded, staggered view of an example of an auxiliary plate assembly;

FIG. 7A provides a view of the back of auxiliary front plate 175;

FIG. 8 is a perspective view of an auxiliary wall plate system of the articulated auxiliary wall plate system;

FIG. 9 is a side view along line VII-VII of the plate depicted in FIG. 8;

FIG. 10 is a perspective view of another auxiliary wall plate of the articulated wall plate system;

FIG. 11 is a side view along line XI-XI of the auxiliary wall plate of FIG. 10;

FIG. 12A is an exploded, staggered view of the base plate assembly of FIG. 12;

FIG. 15 is another example of the switchable plate variation; and

FIG. 16 is an example of the switchable plate variation configured for an outlet box.

DETAILED DESCRIPTION

Figure 1:
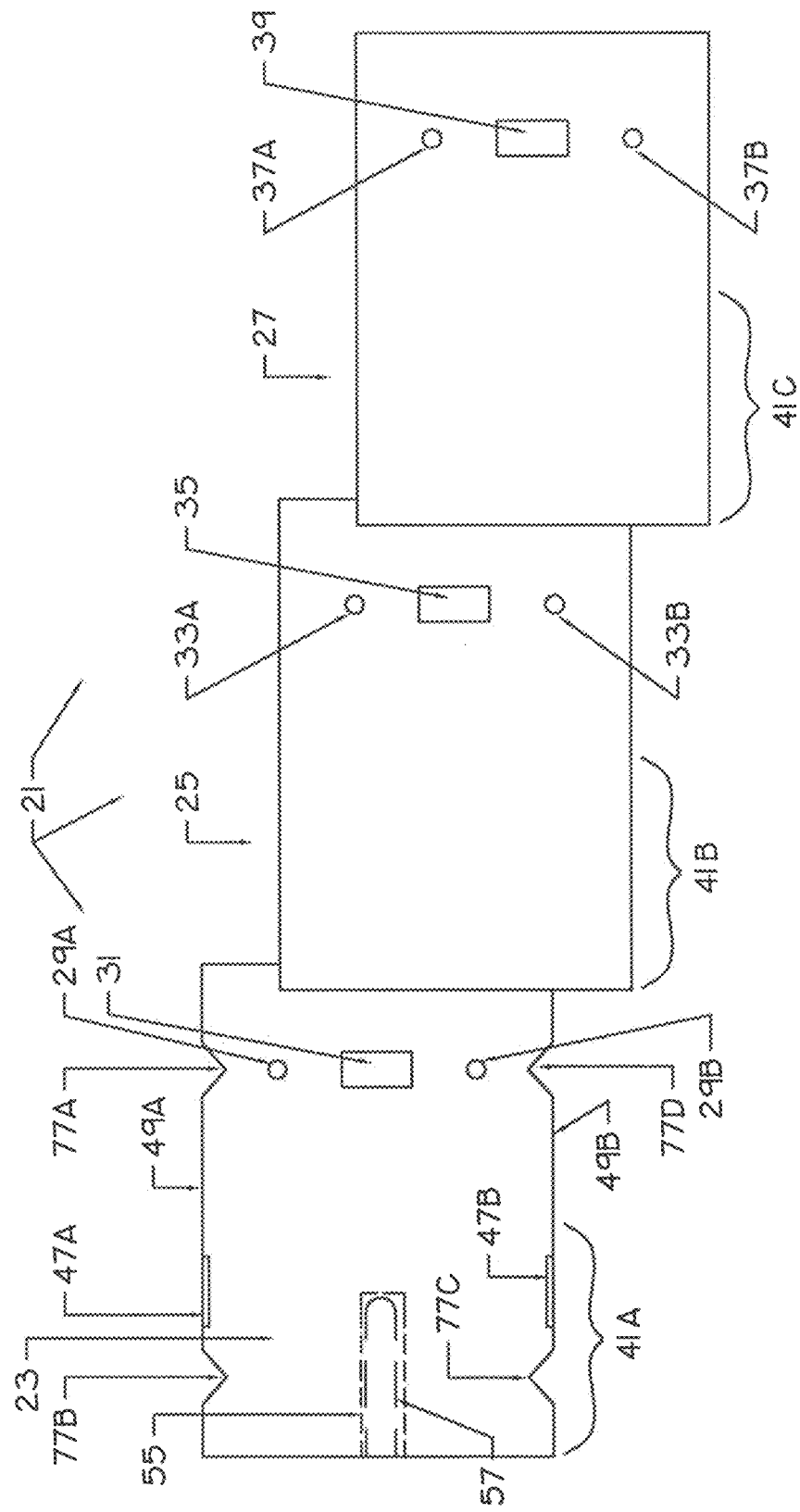
FIG. 1 is a exploded, staggered view of the plates of the basic plate assembly of the present invention.

Various embodiments will be further clarified by the following examples. FIG. 1 provides a staggered, exploded view of the plates of the base plate assembly 21. The assembly includes back plate 23, center or creative plate 25 and cover or front plate 27. Back plate 23 attaches to the electrical switch box, not shown in in the standard fashion with screws, not shown, through screw holes 29A and 29B. Center plate 25 fits over back plate 23 and its screw holes 33A, 33B and its switch aperture 35 aligns with the screw holes 29A and 29B and switch aperture 31 of back plate 23. In turn, front plate 27 fits over center plate 25 and its screw holes 37A and 37B align with the screw holes of back plate 23 and center plate 25. Front plate 27 switch aperture 39 also aligns with the switch aperture of back plate 23 and front plate 27. When assembled base plate assembly 21 is attached to the electrical switch box, the switch extends through switch apertures 31 of back plate 23, aperture 35 of center plate 25 and aperture 39 of font plate 27. Although, the example shown herein is using a typical electrical switch box, it can also be used on an electrical outlet box as well as other types of wall boxes such as telephone, cable, etc. As noted base plate assembly and primary plate assembly are used synonymously in this disclosure.

Figure 2:
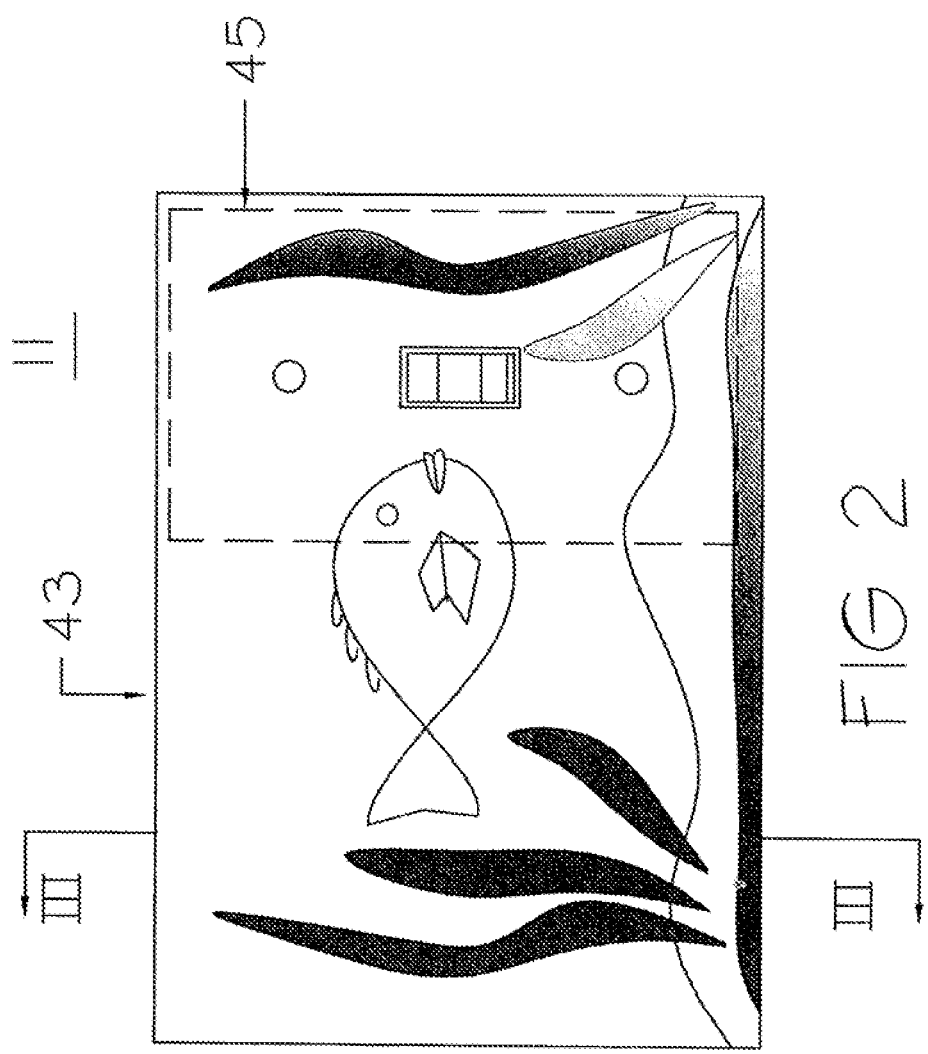
FIG. 2 is a view of the fully assembled basic plate assembly of the present invention attached to a wall and covering an electrical switch box.

In the embodiment of the invention depicted in FIG. 1 the three plates have projections 41A, 41B and 41C that extends out beyond the electrical box covered by the plates. FIG. 2 provides a view of the fully assembled plate assembly 43 mounted on a wall 11 covering an electrical switch box 45 as indicated by the dotted lines since the box is covered by the plates. Also, it should be noted that base plate and back plate are sometimes used interchangeably.

Figure 3:
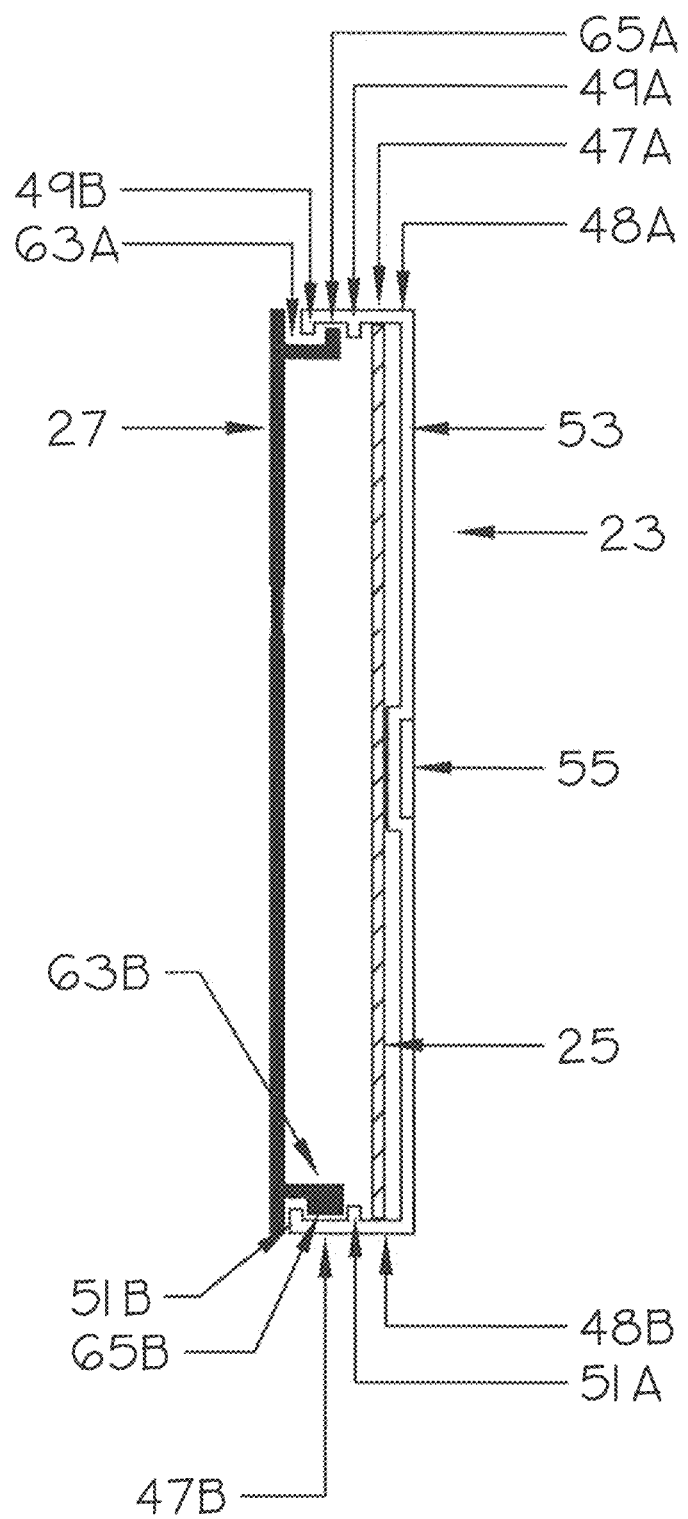
FIG. 3 is a cross-sectional view along line III-III of FIG. 2.

FIG. 3 is a cross-sectional view of plate assembly 43 along line III-III of FIG. 2. Referring to FIG. 1 as can be seen line III-III cuts through the center of two securing tracks 47A and 47B on back plate 23. Securing tracks 47A and 47B are embodiments of the engaging portion of back plate 23. Both securing tracks are located opposite each other on the top and bottom edge respectively of back plate 23 and only extend along a limited portion of the top edge and bottom edge of back plate 23. Referring back to FIG. 3, securing tracks 47A and 47B are mirror image structures. Track 47A is formed by projection 48A that extend off at 90° from the top edge of back plate 23. Extending off of projection 48A are two parallel flanges 49A and 49B. Likewise securing track 47B is formed by projection 48B extending off at 90° from the bottom edge of back plate 23. Extending off of projection 48B are two parallel flanges 51A and 51B. Securing track 47A is made up of projection 48A and parallel flanges 49A and 49B. Likewise, securing track 47B is made up of projection 48B and parallel flanges 51A and 51B.

The opposing set of flanges 49A and 51A retain center plate 25 which can either be snapped into place or slid into place in the space between flange 49A and 51A and the main wall 53 of back plate 23. Referring to FIG. 1 and FIG. 2, it will be readily apparent that once center plate 25 is snapped into place and screw holes 33A and 33B of center plate 25 are aligned with screw holes 29A and 29B of back plate 23 both back plate 23 and center plate will become congruent with each other and held in place together once screws are inserted into the screw holes and into the screw receptacles on the electrical box being covered.

Referring to FIG. 3, the main body or wall 53 of back plate 23 has a mechanism to hold extended portion 41A of the back plate in place when the base plate assembly 21 is connected to the electrical box. In the embodiment depicted, channel 55 provides a place to attach a securing tab 57 to secure extended portion 41A to the wall, which together with the screws inserted through the respective screw holes of each of the plates holds base plate assembly 21 in place. In the embodiment disclosed herein the extended portion 41A of back plate 23 is stabilized and held in place by an adhesive tab 57, which is placed in channel 55. Tab 57, is a thick tape with adhesive on both sides of the tape, one side adhering to channel 55 and the second side detachably connecting to the wall. The preferred embodiment of the invention uses as tab 57 Command™ adhesive tab that has adhesive surface on both sides. Command™ is a trademark of 3M Company which manufactures the tabs. When installing the base plate system tab 57 is initially secured in channel 55. Then when the plate assembly 21 is attached to the wall the exposed second adhesive surface of the Command™ adhesive tab secures it to the wall. Thus, tab 57 is an embodiment of a detachable connecting mechanism.

FIG. 3A provides a view of the backside of front plate 27, which has two securing flanges of 63A and 63B. Securing flanges 63A and 63B are one embodiment of the engaging portion of front plate 27. When front plate 27 is connected to back plate 23 securing flange 63A lines up with securing track 47A and securing flange 63B lines up with securing track 47B. Both securing flanges 63A and 63B are L-shaped. Referring to FIG. 3, securing flange 63A fits into channel 65A of securing track 47A and securing flange 63B fits into channel 65B of securing track 47B. The securing flanges 63A and 63B can be slid into the channels 65A and 65B or they can be snapped on. As depicted, channel 65A is formed by flange 49A and 49B on our projection 48A. Likewise, channel 65B is formed by flange 51A and 51B on projection 48B. Thus, screw holes 29A and 29B of base plate 23, screw holes 33A and 33B of center plate 25, screw holes 37A and 37B of front plate 27, together with the securing and aligning structure, securing tacks 47A and 47B on back plate 23 and the engaging portion, flanges 63A and 63B on front plate 27 together form the connection and aligning mechanism.

Any flexible resilient material capable of holding its shape can be used to make the plate systems of the present invention. Plastic like, composite material or flexible metal are the preferred materials. The flexibility of the material allows for either method of engaging the securing flanges 63A and 63B on front plate 27 to securely fit into securing tracks 47A and 47B of back plate 23 namely snapping front plate into place by aligning flanges 63A and 63B on front plate 27 with flanges 49B and 51B on back plate 23 and pushing front plate 27 against back plate 23.

Figure 4:
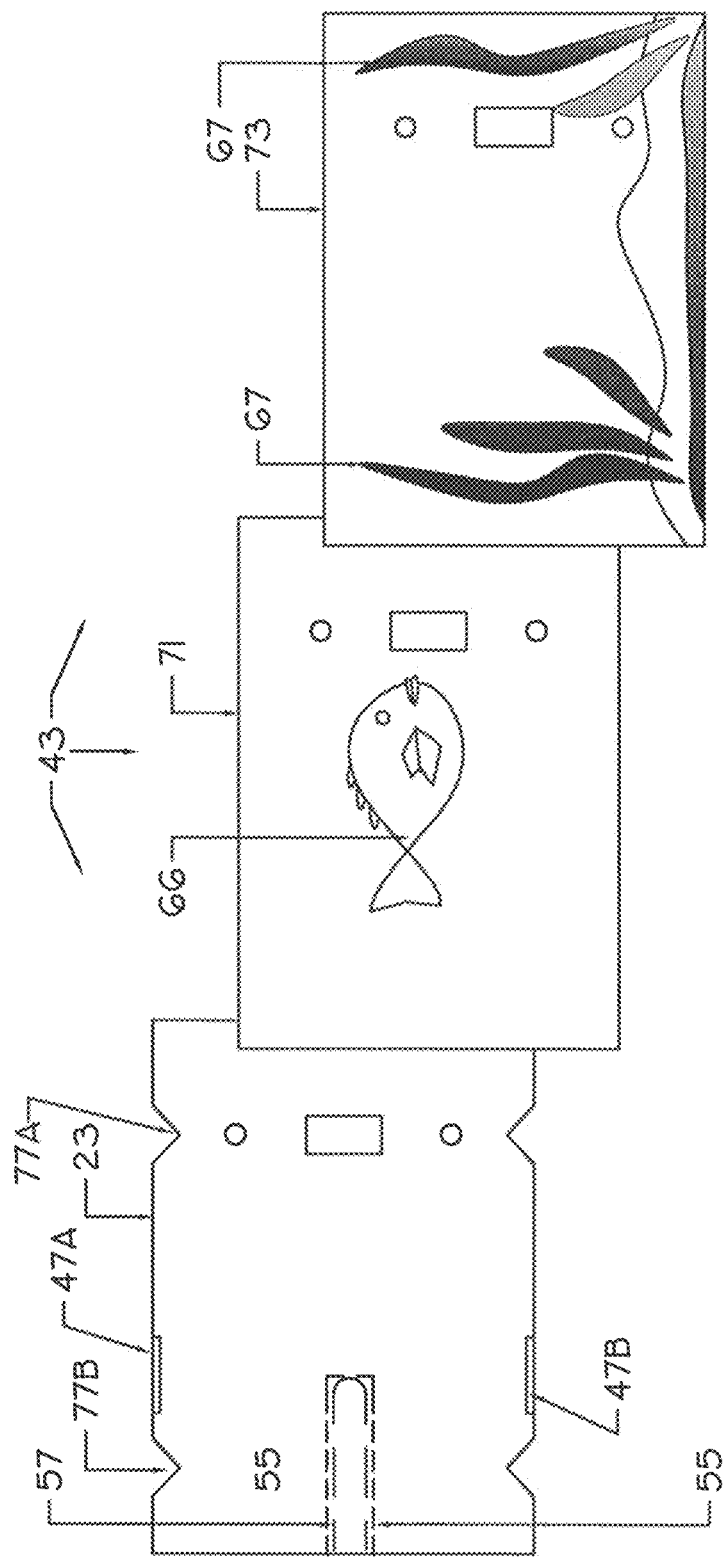
FIG. 4 is a exploded, staggered view of the plate assembly depicted in FIG. 2.

FIG. 4 is a staggered exploded view of the variation 43 of the base plate assembly with artwork added to center plate 71, an image of a fish 66, and images of aquatic plants 67 etched onto front plate 73. Front plate 73 in this embodiment of the invention is made of a clean plastic or glass-like material onto which images or designs can be etched or painted. FIG. 2 as noted above provides a view of base plate assembly 43 fully assembled and attached to a wall and covering an electrical switch box, not visible but is indicated by outline 45.

Figure 5:
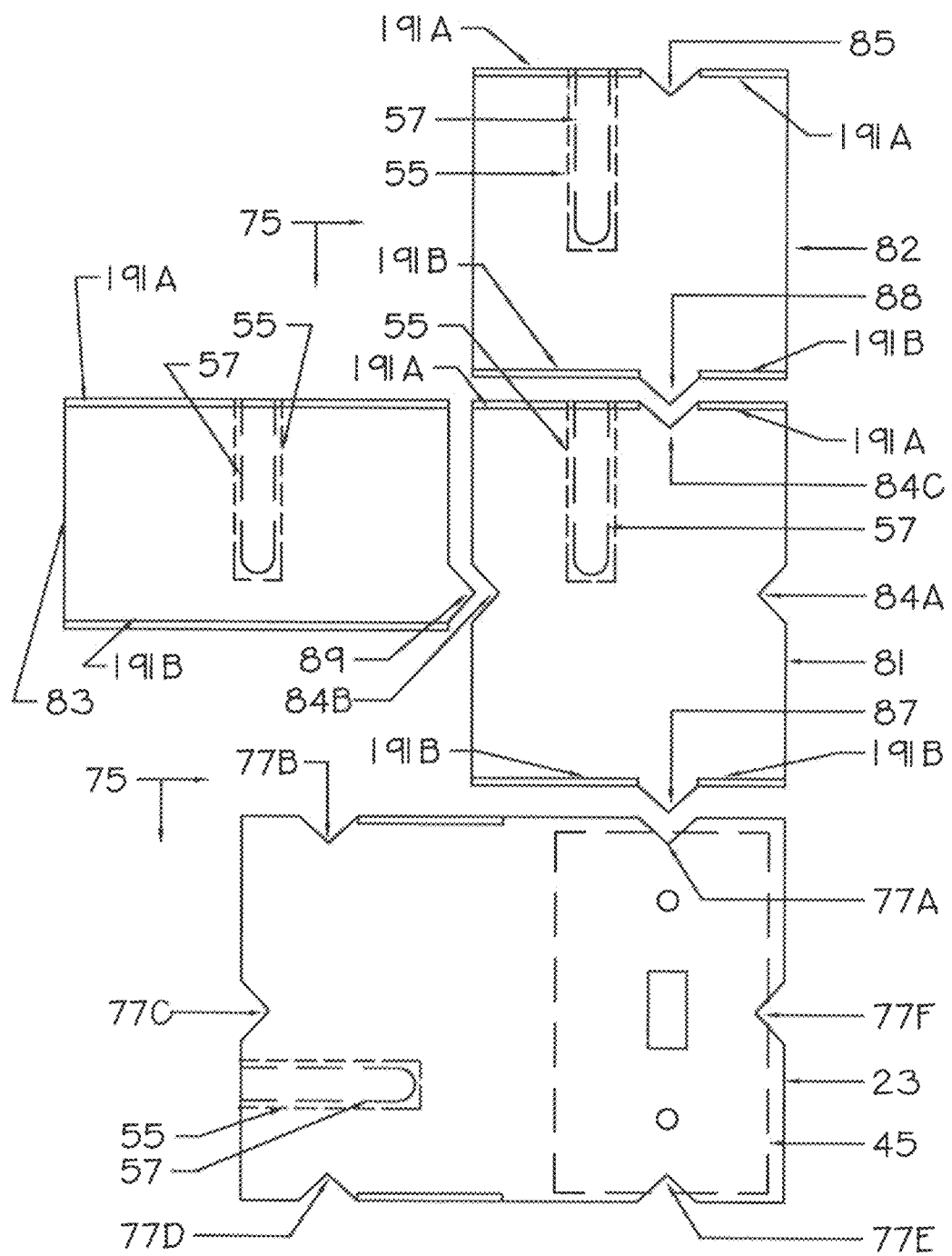
FIG. 5 is a view of the base wall plates that make up one variation of an articulated auxiliary plate assembly apparatus.

FIG. 5 provides an exploded perspective view of the back plates of an articulated auxiliary back plate configuration 75 of the present invention. In the embodiment of the invention depicted back plate 23 which covers an electrical box acts as the anchor plate of the back plate configuration 75. Back plate 23 in the embodiment of the invention depicted has on its sides or edges securing and positioning detent grooves 77A, 77B, 77C, 77D, 77E and 77F. Auxiliary back plates 81 and 82 have on their edges or sides their own detent grooves, namely detent grooves 84A, 84B and 84C on auxiliary back plate 81 and detent grooves 85 on plate 82. Auxiliary back plates 81, 82 and 83 each have on their sides or edges linking projections 87, 88 and 89 respectively. Linking projections 87, 88 and 89 fit into the detent grooves. Additionally, each of the auxiliary back plates 81, 82 and 83 each has their own channel for a securing tab namely channel 55. The channel is shown in outline form since it is on the reverse side of each plate, on the side of the plate that faces the wall. Double sided adhesive tape 57, also in outline, is positioned in channel 55 of each plate.

As can be seen in FIG. 5, an articulated plate configuration based on back plate 23 and the auxiliary back plates 81, 82 and 83 interconnected using the detent groove and linking projection mechanism can be formed on the wall around the back plate 23. The auxiliary plates are held in place by securing tabs 57 secured in the respective adhesive tab grooves namely channel 55, of auxiliary base plates 81, 82 and 93 83. Thus, as can be seen the projections together with detents or dent groves form a plate interconnecting apparatus. In the example shown in FIG. 5 projection 87 of auxiliary back plate 81 detachably fits into detent or detent grove 77A of base plate 23, projection 88 of axillary back plate 82 detachably fits into detent 84C of auxiliary base plate 81, and projection 89 of auxiliary base plate 83 detachably fits into detent or detent grove 84B of auxiliary base plate 81. Together they form an articulated base plate configuration when connected and attached to a wall.

Each of the auxiliary back plates 81, 82 and 83 have a securing mechanism that allows for the attaching of a center plate and cover or front plate to them. The center and cover plates being designed to accept art work or provide other features as described below.

Figure 6:
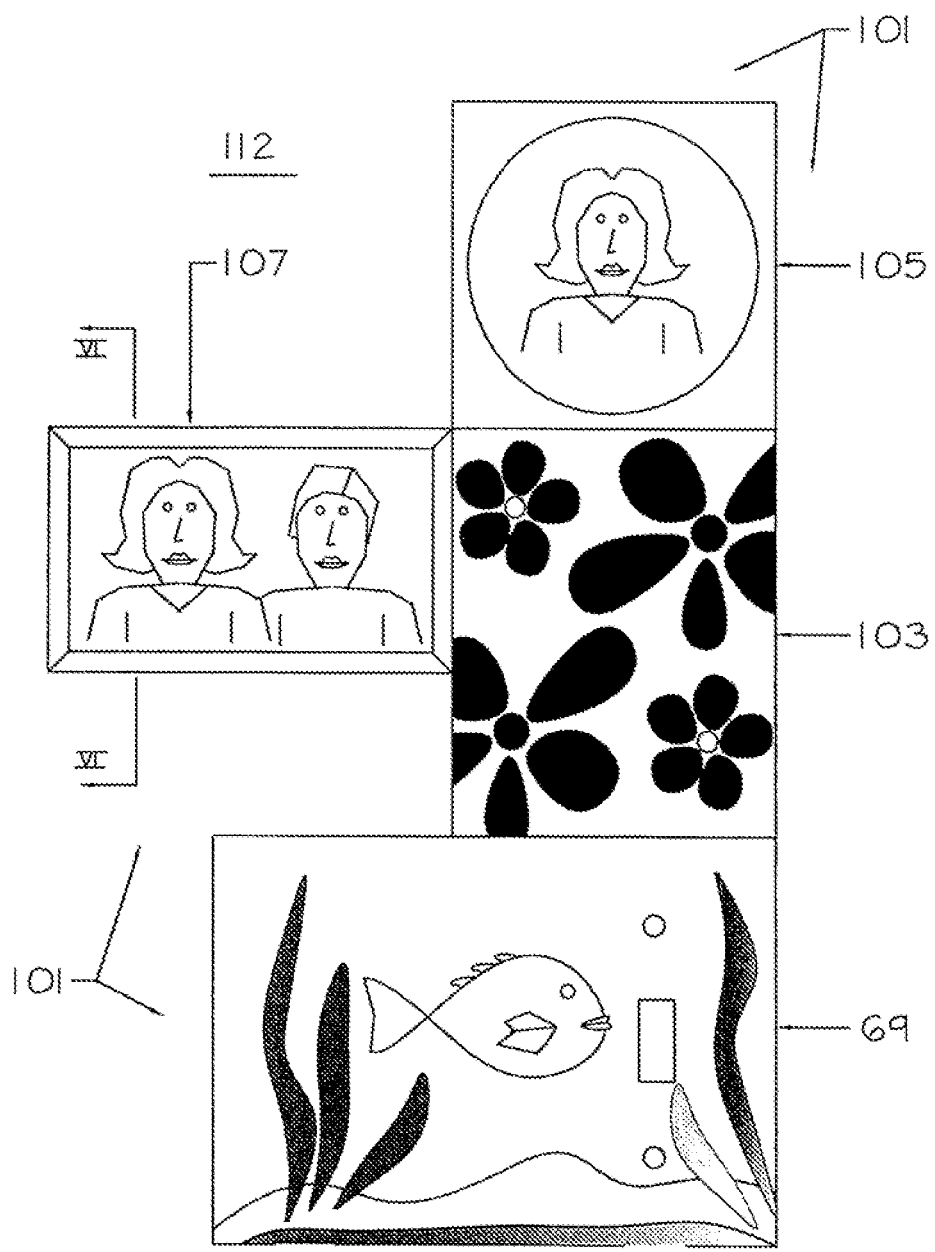
FIG. 6 is an example of a fully assembled articulated auxiliary plate system attached to a wall, in a predetermined configuration adjacent a primary plate assembly.

FIG. 6 provides a view of a fully assembled articulated plate system 101 mounted on a wall 112 in which the base plate assembly of FIG. 2 alternatively identified as primary plate assembly 69 appears in FIG. 6 and fully assembled auxiliary plate systems 103, 105 and 107 are included. For example, auxiliary plate assemblies 105 and 107 provide picture frames in which pictures can be placed. Auxiliary plate assembly 103 provides a decorative pattern. The decorative pattern depicted in FIG. 6 is just one predetermined configuration in which the auxiliary plate assembles are positioned in a predetermined position adjacent the primary plate assembly 69.

FIG. 7 provides an exploded view of auxiliary plate assembly 107. It consists of back plate 83, center plate 173 and front plate 175. Back plate 83 as previously noted has detent projection 89 to interlink it with an adjacent auxiliary back plate 81 as depicted in FIG. 5 or alternatively to the back plate of the base plate assembly not depicted. Base plate 83 also has a channel 55 for an adhesive tab 57 to help secure it to the wall as described above.

In FIG. 7, the auxiliary plate assembly in the embodiment of the invention depicted, back plate 83, center plate 173 and front plate 175 connect together with the same structure and mechanism as base plate assembly 21 with two notable exceptions. First auxiliary plate assemblies do not have screw holes and do not use screws to connect, and the flange based interlocking system between the three plates depicted in FIG. 3 as will be discussed below extends along the entire length of the entire top and bottom edges of back plate 83 and front plate 175.

Figure 6A:
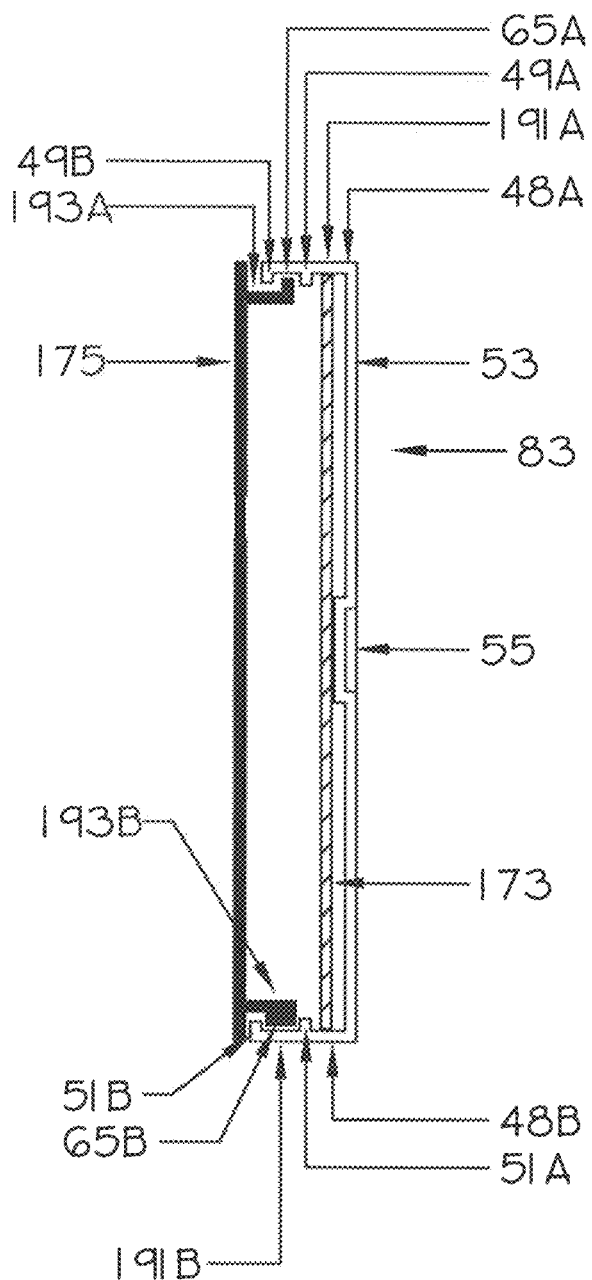
FIG. 6A is cross-sectional view of FIG. 6 along line VI-VI.

FIG. 6A is a cross-sectional view of auxiliary plate assembly 107 along line VI-VI of FIG. 6. When FIG. 6A is compared with FIG. 3 it will be noted they are the same. The only difference is that the securing tracks 191A and 191B on the base auxiliary plate 83 as seen in FIGS. 5 and 7 extend across the entire bottom and top edge of back auxiliary plate 83. Referring to FIG. 1 on the back plate 23 of the base plate assembly, securing tracks 47A and 47B only extend across a portion of back plate 23. Likewise in FIG. 3A Securing flanges 63A and 63B only extend across a portion of the back side of front plate 27. However as depicted in FIG. 7A, a view of the reverse side of auxiliary front plate 175, securing flange 193A at the top of the plate, and securing flange 193B at the bottom of the plate run across the entire top and bottom of the plate. Likewise in FIG. 5 securing tracks 191A and 191B run across the entire top and bottom respectively. Referring to FIG. 6A when the plates are joined securing flange 193A of of front plate 175 engages securing track 191A of auxiliary back plate 83 and securing flange 193B of front plate 175 engages securing track 191B of auxiliary back plate 83.

Regarding FIG. 6A and securing tracks 191A and 191B and securing flanges 193A and 193B, other than extending along the entire top and bottom portion of the back and front, the plates have the same structure and function as securing tracks 47A and 47B and securing flanges 63A and 63B. Thus, the balances of the reference numbers on FIG. 6A are the same as those on FIG. 3 since they have the same function. Consequently, securing track 191A is formed by projection 48A that extends off at 90° from the top edge of plate 83, and two parallel flanges 49A and 49B, extending off of projection 48B. Likewise with respect to securing track 191B it is formed by projection 48B extending off of the bottom edge of plate 83 at 90° with two parallel flanges 51A and 51B extending off of projection 48B. On front plate 175 L shaped securing flange 193A is at the top and L shaped securing flange 193B is at the bottom Referring to FIG. 6, auxiliary plate assembly 107 is a picture frame. As noted FIG. 7 depicts an exploded view of plate assembly 107. Center plate 173 provides a surface to attach the picture 195. In the embodiment of the invention depicted, glue or double-sided adhesive tape is used to attach the picture to center plate 173. Alternatively, if the picture is the same size as center plate 173, it can be held in place by being sandwiched between center plate 173 and front plate 175. Front plate 175 can consist of a clean sheet that covers the entire picture or simply a frame that holds the edges. Additionally, various other mechanical means not shown can be used to secure the picture in the auxiliary plate system.

FIG. 8 is another example of an auxiliary plate system 111 which provides key ring hooks 113 and 114. It also includes a removable finial 115 that not only adds a decorative touch, but can also be used to snap the cover plate 117 and center plate 119 free from back plate 121 of the auxiliary plate assembly 123. Detent linking projection 125 can also be seen which fits into a detent groove on a plate assembly which would be located below it on the wall 127.

FIG. 9 is a cross-sectional view of plate 123 FIG. 8 along line VII-VII. Given the view of plate 123, key hook 114 is visible. Also, linking projection 125, attached to back plate 121 below on the wall 127.

FIG. 10 is a perspective view of another variation of an auxiliary plate system 141 of the present invention. Auxiliary plate system 141 consists of cover plate 143, center plate 145 and back plate 147. Cover plate 143 includes a pen or pencil pocket or holder 149, a sticky note pocket 153 to hold the sticky notepad (sticky note being the generic name for Post-It® notes [3m]) and a sticky note area 151 to put a sticky note on which a message or note has been written. It also includes a removable finial 115 to pry the plates apart when they need to be disassembled. Back plate 147 also has a linking tab 155. FIG. 11 provides a side view of auxiliary plate system 141 along lines XI-XI of FIG. 11, attached to a wall 157.

Figure 12B:
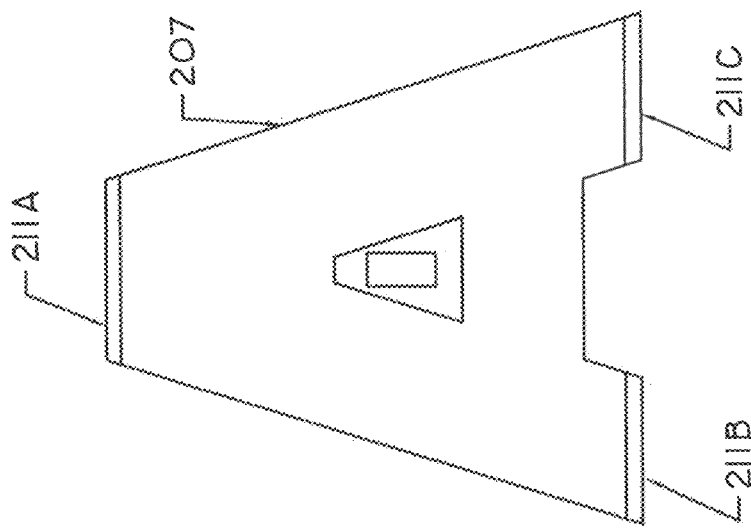
FIG. 12B is a view of the back of front plate 207.
Figure 12:
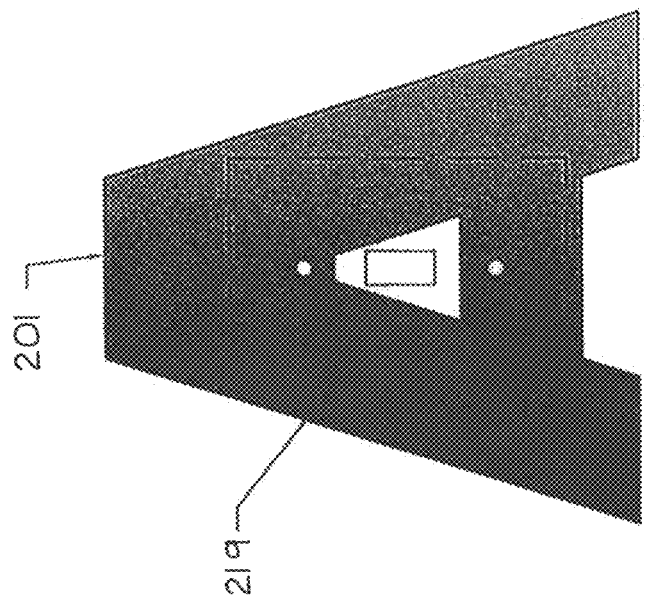
FIG. 12 is a view of another embodiment of a base plate assembly covering an electrical wall box.

FIG. 12 depicts another variation of the plate system of the present invention that utilizes the triple plate interconnecting feature of the present invention. FIG. 12 is a fully assembly triple plate system 201. FIG. 12A provides an exploded, staggered view of the three plates, namely the back plate 203, the center plate 205 and the cover or front plate 207. On back plate 203, the securing tracks 209A, 209B and 209C are visible. Referring to FIG. 12B, securing flanges 211A, 211 and 211C are visible on the reverse side of front or cover plate 207.

The securing track 209A, 209B and 209C on back plate 203 are the same as those depicted in FIGS. 3 and 6A. Likewise, the securing flanges 211A, 211B and 211C on front plate 207 are the same as those depicted in FIG. 6A. Thus, plates 203, 205 and 207 can be connected the same as the other plate assemblies. Once triple plate assembly 201 is assembled it can be connected to cover a wall electrical box through the respective screw holes on each plate which line up. Plate 203 has screw holes 213A and 213B, plate 205 has screw holes 215A and 215B and plate 207 has screw holes 215A and 217A line up when plate system 201 is assembled. Likewise, screw holes 213B, 215B and 217B line up when plate system 201 is assembled. Referring to FIG. 12 as previously noted, a fully assembled base plate assembly is depicted covering an electrical switch box depicted in outline 219 form is covered by the plate assembly 201.

Figure 13:
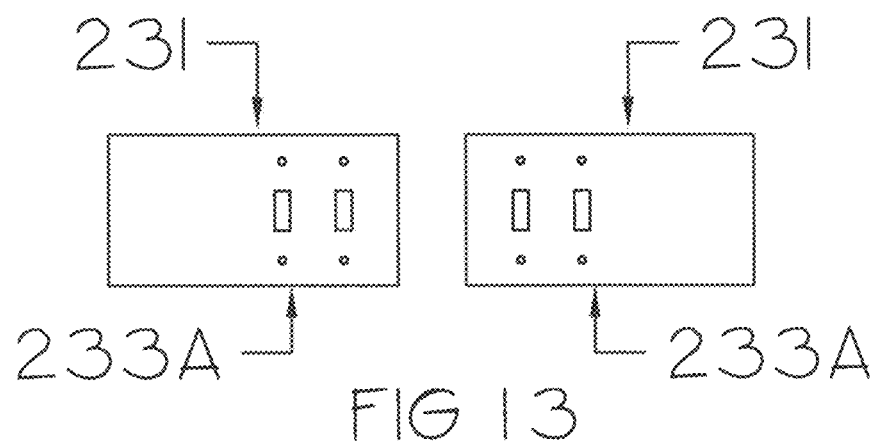
FIG. 13 is another variation of the invention depicting the switchable plate system.
Figure 14:
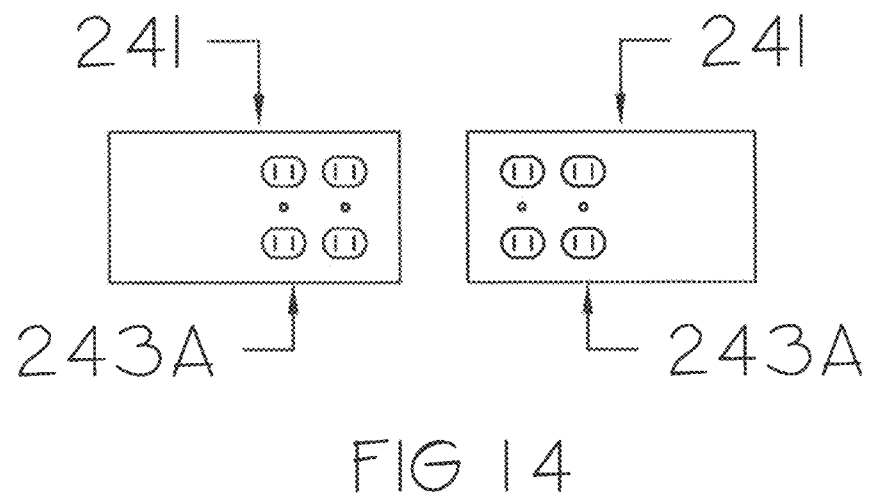
FIG. 14 is another example of the switchable plate invention.

The examples of the base plate system depicted in FIGS. 1 to 4 show the extended portion, 41A, 41B and 41C extend off to the left side of the switch box, see FIGS. 1 and 2, the base plate assembly can be easily switched in its orientation. FIG. 13 depicts a base plate assembly 231 in a left hand orientation 233A and in a right hand orientation 233B as it might be positioned on a wall covering an electrical outlet. FIG. 14 depicts a variation of an electrical base plate system 241 covering an electrical outlets first in a left hand orientation 243A then in a right hand orientation 243B.

FIG. 15 provides a view of another variation of the base plate system 251 of the present invention that can be configured in either an upward extending orientation 253A or a downward extending orientation 253B.

FIG. 16 provides yet another variation of the base plate system 261 designed to cover a two-switch box in either an upward configuration 263A or a downward configuration 263B. As is indicated by FIGS. 13 to 16, the base plate system of the present invention can be configured in a variety of different ways and can easily be designed to cover both outlets, switchboxes, or a combination of the two. Naturally, the auxiliary plate can be incorporated with any of the variations of the base plate system.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An electrical wall box plate cover assembly comprising:
   a) a back plate configured to attach to an electrical wall box;
   b) a center plate configured to connect to said back plate with a connection and aligning mechanism;
   c) a front plate configured to connect to said back plate with said connection and aligning mechanism;
   d) wherein when said back plate, said center plate and said front plate are attached together with said connection and aligning mechanism, electrical interface apertures located on said front plate, said center plate and said back plate are aligned together, and thus allow access to an electrical system interface device;
   e) wherein said front plate consists of a clean, light transparent material and said center plate can be configured with art work;
   f) said back plate, said center plate and said front plate each have an extended portion; and
   g) said connection and aligning mechanism comprises:
      1) screw holes on each of said plates that when said screw holes on each plate are aligned, said plates can be attached to an electrical interface outlet; and
      2) said back plate having a securing and aligning structure to secure a portion of said center plate and connect to an engaging portion of said front plate to connect said front plate to said back plate, wherein said securing and aligning structure on said back plate is at least one flange gripper and said engaging portion on said front plate is at least one flange.

2. The electrical wall box plate cover assembly of claim 1 wherein said center plate is provided with a surface to accept art work which can be viewed through said cover plate when said back plate, center plate and front plate are connected together with said securing mechanism.

3. The electrical wall box plate cover assembly of claim 2 wherein artwork can be added to said cover plate.

4. The electrical wall box plate assembly of claim 3 wherein artwork can be added to said cover plate by etching said cover plate.

5. The electrical wall box plate assembly of claim 1 further comprises a plate assembly with an aperture for an electrical wall box containing electrical interface devices selected from a group consisting of a electrical switches, electrical outlets and a combination of a switches and outlets.

6. The electrical wall box plate assembly of claim 1 wherein:
   a) said at least one flange gripper, on said back back plate is first flanged gripper located on a top edge of said back plate and projecting out from said base plate and a mirror image second flange gripper on a bottom edge of said back plate opposite said first flange gripper;
   b) said at least one flange is a first flange projecting from a backside of said front plate adjacent its top edge and a mirror image second flange projecting from said backside of said front plate adjacent a bottom edge of said front plate, said first and second flange being positioned such that when said back side of said front plate faces said back plate and said screw holes of said front plate and said back plate are aligned said first flange of said front plate aligns with said first flange gripper and said second flange aligns with said second flange gripper and first and second flanges can detachably engage said first and second flange grippers; and
   c) said center plate is gripped by said first and second flange gripper.

7. The electrical wall box plate assembly of claim 1 wherein said back plate has at least one positioning and aligning structure that together with a position and aligning structure on an auxiliary back plate aligns said back plate and said auxiliary back plate such that when said plates are aligned together on a wall they form a predetermined configuration on the wall.

8. The electrical wall box plate assembly of claim 7 wherein said at least one positioning and aligning structure on said back plate is a detent and said positioning and aligning structure on said auxiliary back plate is a projection that mates with said detent.

9. The electrical wall box plate assembly of claim 1 wherein said extended area of said back plate assembly when covering an electrical box can project from the electrical box in in a direction selected from the group consisting of up, down, left or right.

10. The electrical wall box plate cover assembly of claim 1 further comprising a detachable connecting mechanism on said reverse side of said base plate to detachably connect said extended portion of said back plate to the wall.

11. The electrical wall box plate assembly of claim 10 wherein said detachable connecting mechanism, to detachably connect said extended portion of said back plate to a wall, comprises a tab channel on said extended portion of said back plate wherein said tab channel can accommodate a first surface of a tab with adhesive on said first surface and adhesive on an opposite second surface of said tab, which second surface can be placed against a wall to secure said extended portion to the wall.

12. A functional and decorative wall plate configuration comprising:
   a) a primary plate assembly that covers an electrical wall box interface;
   b) at least one auxiliary plate assembly that detachably interconnects through a plate interconnecting apparatus to said primary plate assembly such that when said primary plate assembly is attached to a wall and covering an electrical interface box said at least one auxiliary plate assembly can be positioned in a predetermined position adjacent to said primary plate assembly to provide a predetermined configuration on the wall; and
   c) said plate interconnecting apparatus comprises at least one detent on a side of said primary plate assembly that connects to at least one projection on a side of said auxiliary plate assembly to allow said primary plate assembly and said auxiliary plate assembly to be positioned adjacent to each other.

13. The functional and decorative wall plate configuration of claim 12 wherein said primary plate assembly is comprised of said back plate, a center plate and a front plate, and said back plate, said center plate and said front plate are connected together by an interconnect mechanisms on said back and front plate.

14. The functional and decorative wall plate configuration of claim 12 wherein said auxiliary plate assembly is comprised of said back plate, a center plate and a front plate, and said back plate, said center plate and said front plate are connected together by an interconnect mechanism on said back and front plate.

15. The functional and decorative wall plate configuration of claim 12 wherein the electrical wall box interface is selected from a group of a switch box, an outlet box of a combination of a switch-outlet box.

16. The functional and decorative wall plate configuration of claim 12 wherein said at least one auxiliary plate assembly is selected from a group consisting of a picture frame, a key holder, a note holder or a design pattern holder.

17. An electrical wall box plate cover assembly comprising:
   a) a back plate configured to attach to an electrical wall box;
   b) a center plate configured to connect to said back plate with a connection and aligning mechanism;
   c) a front plate configured to connect to said back plate with said connection and aligning mechanism;
   d) wherein when said back plate, said center plate and said front plate are attached together with said connection and aligning mechanism, electrical interface apertures located on said front plate, said center plate and said back plate are aligned together, and thus allow access to an electrical system interface device; and
   f) said connection and aligning mechanism comprises:
      1) screw holes on each of said plates that when said screw holes on each plate are aligned, said plates can be attached to an electrical interface outlet; and
      2) said back plate having a securing and aligning structure to secure said center plate and connect to an engaging portion of said front plate to connect said front plate to said back plate with said center plate there between;
   g) said securing and aligning structure on said back plate is first flanged gripper located on a top edge of said base plate and projecting out from said base plate and a mirror image second flange gripper on a bottom edge of said back plate opposite said first flange gripper; and
   h) said front plate engaging portion comprising a first flange projecting from a backside of said front plate adjacent its top edge and a mirror image second flange projecting from said backside of said front plate adjacent a bottom edge of said front plate, said first and second flanges being positioned such that when said back side of said front plate faces said back plate and said screw holes of said front plate and said back plate are aligned said first flange of said front plate aligns with said first flange gripper and said second flange aligns with said second flange gripper and first and second flanges can detachably engage said first and second flange grippers.

18. The electrical wall box plate cover assembly of claim 17 wherein:
   a) said center plate is provided with a surface to accept art work which can be viewed through said cover plate when said back plate, center plate and front plate are connected together with said securing mechanism; and
   b) wherein said aligned apertures are sized and positioned to accept interface devices selected from a group consisting of: electrical switches, electrical outlets and a combination of electrical switches and electrical outlets.

19. A method for providing a functional and decorative wall plate configuration comprising the steps:
   a) providing a primary plate assembly that covers an electrical wall box interface;
   b) providing at least one auxiliary plate assembly that interconnects through a plate interconnecting apparatus to said base plate assembly such that when said primary plate assembly is attached to a wall and covering an electrical interface box said auxiliary plate assembly can be positioned in a predetermined position adjacent to said base plate assembly to provide a predetermined configuration on the wall; and
   c) wherein providing a plate interconnecting apparatus comprises at least one detent on a side of said primary plate assembly that connects to at least one projection on a side of said auxiliary plate assembly to allow said primary plate assembly and said auxiliary plate assembly to be positioned adjacent to each other.

* * * * *